3,712,931
CHLOROFLUORINATION OF OLEFINS
J. Warren Hamersma, Tustin, and Frederick F. Caserio, Jr., Laguna Beach, Calif., assignors to Atlantic Richfield Company, Philadelphia, Pa.
Filed July 23, 1969, Ser. No. 844,118
Int. Cl. C07c 17/02, 19/08
U.S. Cl. 260—653.7
13 Claims

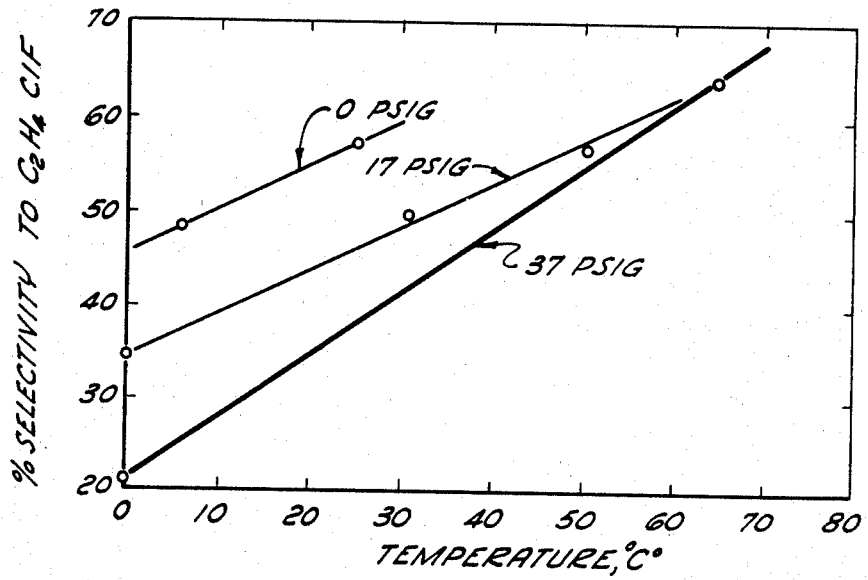
Fig. 3. VARIATION OF SELECTIVITY TO $C_2H_4ClF$ WITH TEMPERATURE AT CONSTANT PRESSURE
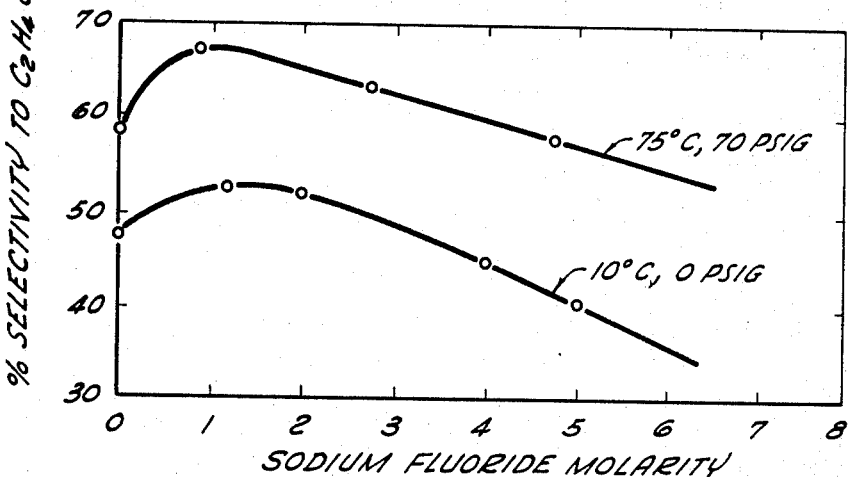
Fig. 4. VARIATION OF SELECTIVITY TO $C_2H_4ClF$ WITH SODIUM FLUORIDE MOLARITY
INVENTORS
FREDERICK F. CASERIO, JR.
J. WARREN HAMERSMA United States Patent Office 3,712,931
Patented Jan. 23, 1973

ABSTRACT OF THE DISCLOSURE

Ethylene and homologous olefins are reacted with chlorine in the presence of anhydrous HF, which may contain from 0.1 to 4 M./l. fluoride ion to produce chlorofluoroparaffins, e.g., $C_2H_4ClF$, which are useful as intermediates in the preparation of monomers. Fluoride ion concentration, achieved by the addition of metal fluoride salts, and temperature-pressure interrelationships permit substantially increased selectivity to the chlorofluoro product and improved yield. Pressures from about 2 to 10 atmospheres are preferred with temperatures near the boiling point of HF at reaction pressure.

BACKGROUND OF THE INVENTION

Field of the invention

This invention relates to a process for producing intermediates for further reaction to produce monomers, vinyl monomers such as vinyl fluoride in particular. This invention relates more particularly to a process for producing fluorochloro substituted paraffins, chlorofluoroethane, a vinyl fluoride precursor, being of especial interest.

Description of the prior art

Vinyl resins are well known articles of commerce having well established utility. Vinyl resin technology is, in general, well known. The preparation of vinyl monomers and the polymerization to resins are described by Smith, "Vinyl Resins," Reinholt, New York, 1958. Vinyl fluoride resins are also known to be valuable commercial materials, see Chemical Engineering, vol. 71, pp. 90–91 (1964). Several copolymers of vinyl fluoride have been described, see for example Journal of the American Chemical Society, vol. 86, pp. 460–63 (1964), Chemistry and Industry, Nov. 27, 1965, p. 1976, and Journal of Polymer Science, A–3, p. 4263 (1965). Reference is made to the foregoing publications and articles cited therein for a more complete description of vinyl fluoride polymers and copolymers and vinyl resin polymerization conditions and processes.

The preparation of fluorochloro substituted paraffins and the further production of vinyl fluoride and other fluoro olefins is described by Thomas in U.S. Pat. No. 2,673,884 issued Mar. 30, 1964. Thomas describes the production of chlorofluoroethane according to the equation.

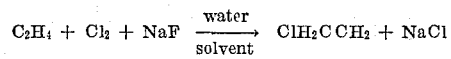

wherein the sodium fluoride is dissolved in water and the ethylene and chloride are passed in as gases. As Thomas points out, chloride ions build up in the aqueous solution as the reaction proceeds and, as this chloride concentration increases, the yield of the desired chlorofluoro compounds decreases. When the dichloro compound becomes the major product, the Thomas process is stopped and a new batch is started.

Thomas also describes the preparation of vinyl fluoride from 1-fluoro-2-chloro ethane by pyrolysis over certain basic materials.

A process using anhydrous HF as a reaction solvent has been described by Knunyants and German, Izv. Akad. Nauk. SSSR. Ser. Khim., 1966, p. 1065, but these authors did not describe the effect of fluoride ion in the reaction medium and the pressure and temperature effects and interrelations were not examined.

A process has now been discovered which obviates the limitations inherent in the Thomas process and, in addition, permits increased yield with unexpectedly high specificity to the fluorochloro compounds and continuous production thereof. It is, therefore, a principal object of this invention to provide an improved process for the continuous production at increased yield and specificity of fluorochloroparaffinic compounds useful in the preparation of unsaturated monomeric materials.

SUMMARY OF THE INVENTION

This invention comprises an improved process for the production of fluorochloro substituted paraffins by ionic chlorination in hydrogen fluoride. The general reaction scheme may be described by the following equations

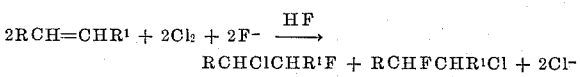

wherein R and $R^1$ are hydrogen, alkyl, aryl, aralkyl, acyl or halogen, and

The present invention is an improvement over the processes of the prior art. Surprisingly high specificity and yields to the desired fluorochloro substituted product are achievable either by the addition of fluoride ion, as a metal fluoride salt preferably, to the HF reaction medium or by carrying out the reaction at a combination of increased pressure and increased temperature. A combination of high temperature and high pressure along with the addition of fluoride ion to the reaction medium are preferred. It is, therefore, a principal object of this invention to provide an improved process for preparing fluorochloro substituted paraffins useful as intermediates in the preparation of unsaturated monomers.

A more specific object of the invention is to provide an improved process for preparing monomer precursors by the chlorofluorination of olefins at increased pressures.

Another specific object of the invention is to provide an improved process for preparing precursors useful in the preparation of unsaturated monomers by chlorofluorination of olefins at increased temperatures.

Yet another specific object of the invention is to provide an improved process for preparation precursors useful in the preparation of monomeric materials by the chlorofluorination of olefins in HF medium containing fluoride concentrations of greater than 0.1 M./l.

Yet an additional specific object of the invention is to provide an improved process for the preparation of chlorofluoro substituted paraffins useful in the preparation of unsaturated monomeric materials by the chlorofluorination of olefins at critical temperatures and pressures in an HF reaction medium containing fluoride salt.

It will be understood that the foregoing specific objects of the invention are not limiting and that other objects of the invention will appear from the specification which follows and from the drawing to which reference is now made.

BRIEF DESCRIPTION OF THE DRAWING

FIG. 3 is a graph showing the variation of selectivity to $C_2H_4ClF$ with pressure at constant temperature, 0° C.

FIG. 3 is a graph showing the variation of selectivity to $C_2H_4ClF$ with temperature at constant pressure.

FIG. 4 is a graph showing the variation of selectivity to $C_2H_4ClF$ with sodium fluoride concentration.

DESCRIPTION OF THE PREFERRED EMBODIMENT

Figure 1:
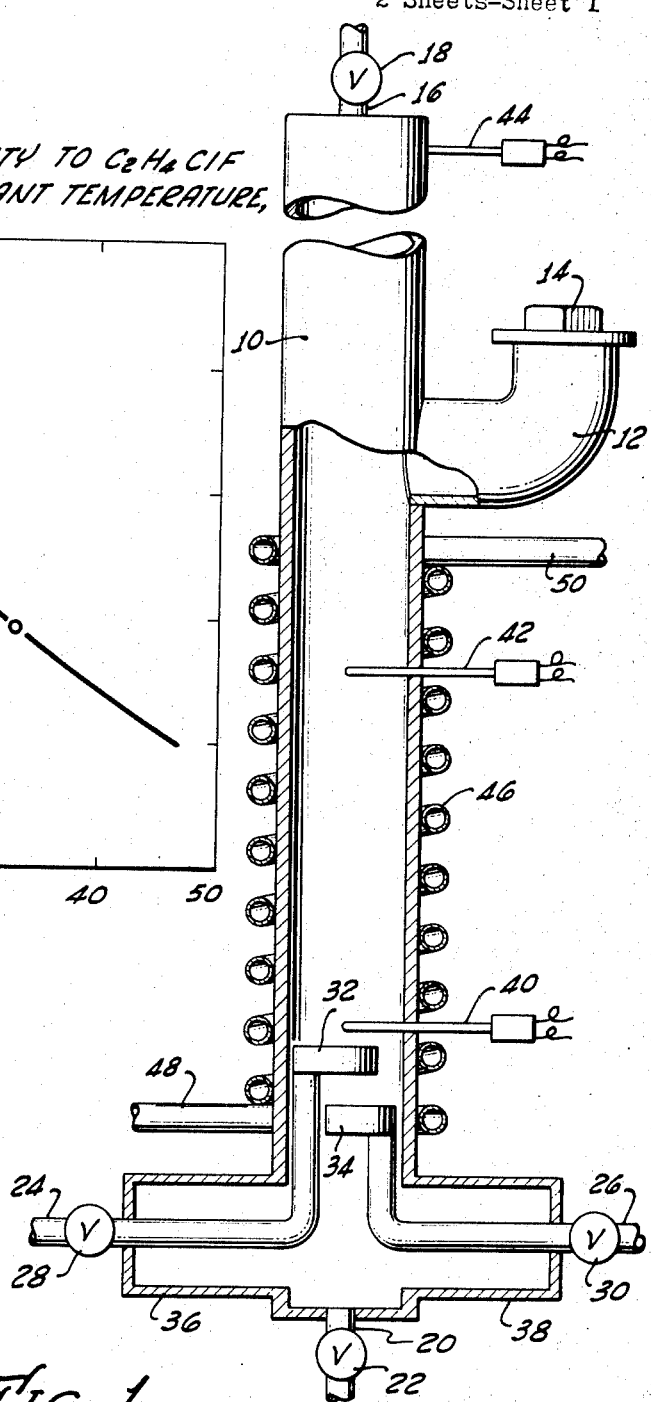
FIG. 1 is a side elevational view, in partial cross section, of a reaction vessel used for carrying out the inventive process.

In a preferred embodiment of this invention, a body of substantially anhydrous HF is enclosed, as for example in the vessel of FIG. 1, such that the reaction pressure can be controlled by the rate of addition of reactants and removal of unreacted materials and reaction products; i.e., by introducing chlorine into the body of HF continuously at a controlled rate and introducing an olefin into the body of HF at a controlled rate. Unreacted chlorine and olefin are removed from the body of HF and fluorochloro substituted hydrocarbons formed in the reaction of the olefin with chlorine in the HF are recovered for use in the preparation of unsaturated monomeric materials and other commercially valuable products. The temperature and pressure of the reaction can be controlled independently but a critical relation of temperature and pressure has been found to give the most desired results. The body of HF may desirably include fluoride ion in the concentration range of greater than 0.1 mole per liter of HF. Fluoride concentrations of from 0.1 to the general range of about 4 moles per liter give unexpectedly high selectivity to the desired chlorofluoro substituted product with high overall yields. Both selectivity and yield may be improved by a combination of chloride ion concentration in the desired range and operation at greater than 1 atmosphere, and preferably greater than about 2 atmospheres pressure and near the boiling point of HF at the reaction pressure.

For convenience hereinafter, reference is now made to FIG. 1 of the drawing which illustrates a convenient laboratory vessel for carrying out the process of this invention.

The vessel comprises a generally vertical tube end provided with a sidearm 12 and a removable cap 14 for permitting introduction of the body of HF which may include an ionic fluoride compound such as a metal fluoride salt. An outlet port at the top of the vessel comprising tube 16 and a valve 18 is provided for controlling the pressure in the vessel, as will be described hereinafter. The bottom of the reaction vessel is provided with a drain outlet comprising 20 and valve 22 for removal of the liquid contents. The bottom is also provided with two fluid inlet conduits 24 and 26 which are provided with valves 28 and 30 respectively. The fluid conduits are connected, respectively, to an upper frit 32 and a lower frit 34 for dispersing the fluid into the vessel. In operation, the first are submerged in a body of HF and the entering material is dispersed therein. For convenience in construction, the vessel is provided with two sidearm extensions 36 and 38, although these extensions perform no particular function with respect to the reaction. Thermocouples 40, 42 and 44 extend into the reaction vessel for monitoring and, if desired, controlling the reaction temperature. The reaction temperature is controlled by a heat exchange tube 46 having an inlet 48 and an outlet 50 for recirculating a cold liquid, e.g., water, oil, etc., therethrough. The tube is coiled about the vessel in heat exchange relationship for carrying out the heat of reaction and chilling or heating the reaction as desired or for otherwise controlling the temperature of the reaction mixture.

A body of HF is introduced through the sidearm 12 into the vessel and the vessel is closed using cap 14. When it is desired to begin the reaction, chlorine and the olefin are introduced, respectively, through the inlet conduits 24 and 26. The disposition of the frits 32 and 34 provides an intermixing of the two fluid reactants, along with HF already in the vessel. As previously indicated, the HF contains, in solution, fluoride ion in the form of metal fluoride salts such as sodium or potassium fluoride.

By use of an appropriate heating or cooling fluid, the temperature of the reaction vessel during reaction may be maintained at any desired level.

The pressure in the reaction vessel is controlled by operating of the valve 18 to permit escape of reaction products and unreacted chlorine and olefin at any desired rate. A suitable pressure regulator and controller may be used to maintain the desired pressures. As was the case with respect to temperature, it was initially found that higher pressures were detrimental to the overall formation of the desired product and to selectivity to the chlorofluoro substituted hydrocarbon.

In the preferred embodiment, the reaction vessel and the components associated therewith are made of cold rolled steel. HF resistant plastics or other materials may be used wholly or in part. For example, polyethylene, polypropylene, polytetrafluoroethylene (Du Pont Teflon) formed or coated tubing and frits may be used in connection with a monel chamber or a stainless steel chamber or, if desired, in connection with a polytetrafluoroethylene constructed or lined chamber.

The vessel used in these experiments was constructed of a 1-inch inside diameter rolled steel tube. Other components of the apparatus are generally in proportion to this dimension. Early experiments, however, were carried out simply in a closed vessel with no special technique or equipment for regulating pressure.

In a preferred embodiment of this invention, the HF reaction medium contains an ionic fluoride compound dissolved therein as a source of fluoride ions. Fluoride ion concentrations in the range of 0.1 M./l. or greater are preferred. Quite unexpected improvements in selectivity to the desired chlorofluoro substituted products have been found with fluoride ion concentrations up to generally about 4 M./l. in HF. Metal fluoride salts are the preferred source of fluoride ion and, because they are conveniently available and handled, alkali metal salts such as sodium and potassium fluoride are preferred. Mixtures of salts, such as aluminum fluoride-sodium fluoride and others may be used as well, however. Metal fluoride salts useful in this invention include the fluoride salts of metals selected from Group I-A, I-B, II-A, II-B, III, IV-A, V-A, or VIII. Specifically, sodium, potassium and cesium fluoride from Group I-A, silver fluoride from Group I-B, mercury fluoride from Group II-B, aluminum fluoride from Group III-A, antimony trifluoride, and antimony pentafluoride and mixed halogen salts of antimony from Group V-A, and cobalt fluoride from Group VIII are preferred.

Since fluorine will replace chlorine, bromine, or iodine in HF, the fluoride salt may be formed in situ in the solution as the result of the addition of a salt where the anion is lower in the electromotive series and may be replaced by fluorine. Sodium chloride addition to the HF body, for example, would result in the formation of sodium fluoride and HCl, the latter being removed with reaction products. From the foregoing, it will be seen that the nature of the salt addition is not critical, the important factor being the presence of fluoride ion at the desired concentration level in the solution. Complexed fluorides are not believed to be effective, except perhaps as a reservoir for free fluoride ion as the reaction proceeds.

In its simplest form, the reaction proceeds in two steps: the electrophilic addition of chlorine to form a β-chlorocarbonium or chloronium ion, RCl+, followed by nucleophilic attack by Cl−, F− or HF to give the dichloride or the mixed halogen product, as illustrated in the following equation.

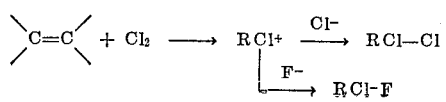

The chloride ion then reacts with HF to form HCl which is not soluble in HF and escapes as a gas, illustrated by the following equation.

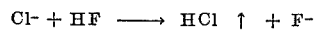

$$Cl^- + HF \longrightarrow HCl \uparrow + F^-$$

This lack of HCl solubility can be utilized advantageously in the synthesis of chlorofluorinated alkanes. Olefins of the general formula

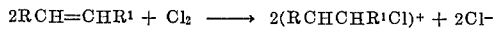

$$2RCH=CHR^1 + Cl_2 \longrightarrow 2(RCHCHR^1Cl)^+ + 2Cl^-$$

wherein R and $R^1$ are hydrogen, alkyl, aryl, aralkyl, acyl, or halogen are useful as starting materials in this invention. When both R and $R^1$ are alkyl, the alkyl radicals should not be larger than $C_6$. When R is aryl or aralkyl, $R^1$ should be hydrogen, lower alkyls such as methyl or ethyl, aryl or halogen. The main limiting factor with respect to the size and nature of the substituents of R and $R^1$ is that if the substituents are unduly long alkyl or unduly large aryl or aralkyl, the solubility of the compound in HF will be so low as to make the reaction economically impractical. Operation at high pressures, (and temperatures) up to 100 atmospheres, for example, is possible to compensate partially for this lack of solubility, however. Olefins having monocyclic aryl and aralkyl substituents are satisfactory in the reaction and bicyclic aryl substituted olefins may be used but the reaction rate will be considerably lower.

Isomerization tendency is also a limiting factor. For example, operating at fluoride salt concentrations greater than about 2 M./l, 1-hexene yields a large number of different fluorochloro substituted compounds because of the shift in the position of the double bond. The reaction is more specific to the 1,2-fluorochloro substituted compound with salt concentrations in the 0.1 to 1 M./l. range. The same effect will be noted with other easily isomerizable olefins which, upon isomerization, will lead to different fluorochloro substituent positions. With such compounds, it is advantageous to operate at a concentration in the general vicinity of about 1 M./l. fluoride salt to take advantage of maximum selectivity and minimum isomerization. Maximum selectivity can be achieved in this range even with such olefins as ethylene so this represents a nearly optimum operating condition regardless of the nature of the olefin.

The volume of the body of HF reaction medium, desirably containing additional fluoride ion, in relation to the flow rates of the chlorine and olefin is not critical but a sufficiently large body of HF to provide intimate contact and intermixture of chlorine and the olefin therein is required for efficient conversion. The ratio of volume of the body of HF to the total flow per minute of chlorine and olefin may suitably vary from greater than about 1:10 to 10:1, or higher. Ratios of approximately 1:1 have been used satisfactorily. For example, a body of HF containing 290 mls. gave satisfactory results with an ethylene flow rate of 146 ml./min. and a chlorine flow rate of 160 ml./min., i.e., a total of 306 ml./min.

In a commercial process, conventional chemical engineering principles would suggest optimum ratios and perhaps alternative configurations for the body of HF. For example, the body of HF may comprise simply a reservoir of HF into which the olefin and chlorine are injected, as described hereinbefore. The body of HF may, however, comprise a packed reactor vessel in which the packing is wetted with HF. Concurrent or countercurrent flow of HF, with respect to the olefin and chlorine, may be desired as a method for maintaining the body of HF in the practice of this invention. The term "a body of HF" is intended to mean any static or dynamic liquid or liquid wetted solid configuration suitable for permitting substantially simultaneous contact of an olefin and chlorine therewith.

The olefin-chlorine flow ratio is not critical and may vary over a very broad range. The olefin-chlorine molar ratio may, for example, vary from greater than 20:1 to less than 1:20. Generally, however, an olefin-chlorine molar ratio of about 1:2 to about 2:1 gives satisfactory yields of the desired product with the desired specificity.

Beginning with a static body of HF, the run length can be varied over an extremely wide range. For example, using from about 170 mls. to about 300 mls. of HF, run lengths of from 1.5 to 6 hours produce satisfactory results. There was no indication that the limit on run length was approached in these experiments. No provision was made in the simple laboratory apparatus in which these experiments were run for removal of the fluorochloroalkane product and the product tended to build up; however, by continuous replenishment of HF to compensate for depletion of HF by the reaction, continuous operation for long periods was possible. Runs up to 20 hours were successful. In a production system with the usual provisions for maintenance of the volume or configuration of the body of HF and removal of the product, the length of run would be limited only by economic factors and, perhaps, limitations on ancillary equipment or steps. The process, therefore, may be fully continuous.

Our investigations have shown that the yield and specificity to the desired fluorochloro compound is dependent upon pressure, temperature, and fluoride ion concentration.

Figure 2:
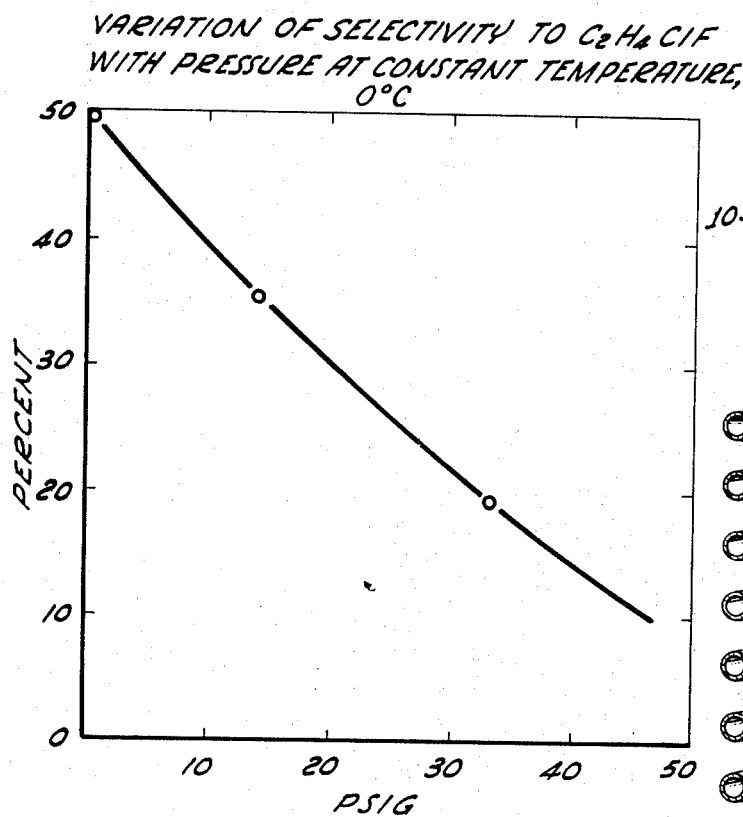

The variation of selectivity to the desired fluorochloroalkane with pressure at constant temperature is exemplified by the data illustrated on the graph of FIG. 2. A body of HF with sodium fluoride at 2.5 M/l. concentration was maintained at 0° C. Ethylene and chlorine were introduced into the body of HF at an ethylene-chlorine ratio of 1:1.1. The ethylene flow rate was 180 ml./min. After a predetermined period from about 1.5 to about 6 hours the additions of ethylene and chlorine were discontinued and the hydrocarbon layer was separated from the hydrogen fluoride, neutralized, and dried. Analysis and assignment of structures were based upon GLC, infrared, NMR, and mass spectrometry as well as physical consultants and chemical separations.

As the data in FIG. 2 clearly illustrate, there is a striking decrease in selectivity to the desired product with increasing pressure when the temperature is held constant. A like phenomena occurs at higher temperatures as well.

On this basis, it was originally believed that minimum pressure should be used in carrying out the inventive process. Obviously, however, the minimum useable process is limited by the vapor pressure of the reactants and products. Operation at below atmospheric pressure is difficult technically and unattractive economically.

It was also found, however, that the selectivity to the desired fluorochloro substituted product with temperature at constant pressure suggested operation at higher temperatures. At higher temperatures, however, the vapor pressure of the reactants and products increases placing practical limitations upon the feasible operating temperatures. Data illustrating this phenomena, at atmospheric, about 17 pounds per square inch gauge and about 37 pounds per square inch gauge are shown in FIG. 3. The data in FIG. 3 were obtained using 250 ml. of 2.3 M./l. solution of NaF in HF. Ethylene was added at a rate of 150 ml./min. with an ethylenechlorine ratio of 1:1.1. Temperatures and pressures were controlled as indicated according to the process previously described.

The data of FIG. 3 illustrate temperature and pressure effects at a constant fluoride ion concentration of approximately 2.3 M./l.; however, highly advantageous and unexpectedly improved yields and specificity to the desired fluorochloro product are obtainable even in the absence of added fluoride ion.

For example, using abody of HF, without added fluoride, at 0° C., an ethylene flow rate of 146 ml./min., and an ethylene-chlorine ratio of 1:1 maximum conversion after 2 hours was 31 percent with 41.8 percent selectivity to the desired fluorochloro compound. At 70 p.s.i.g., using 245 ml. of HF, without added fluoride, an ethylene flow rate of 178 ml./min. and an ethylenechlorine flow ratio of 1:1.1 and a temperature of 72.5° C., conversion of 44.2 percent with a specificity of 59.1 percent to the desired fluorochloro substitute alkane was obtained.

It will be apparent from these data and from the data which follow that even in the absence of an added fluoride ion there is a surprising and quite unpredictable advantage in operating at both higher temperatures and higher pressures. These advantages result from carrying out the reaction at temperatures approximating the boiling point of the HF reaction medium, taking into account the fluoride ion concentration therein and the reaction pressure. Stated differently, an unexpectedly high yield and specificity to the desired fluorochloro product is obtainable by carrying out this reaction at pressures greater than about 2 atmospheres and at temperatures approximately equal to the boiling point of the HF medium under the reaction pressure. As the pressure is increased, the temperature is increased to just below the boiling point of the HF medium at the respective pressure. Operation within about 7° C. and preferably within about 3° C. of the boiling point of the HF-fluoride ion medium at operating pressure results in the unexpectedly advantageous yield and specificity characteristics of the inventive process. The process is advantageous with temperatures wihin 10 or 15 degrees of the boiling point, however. It is contemplated that the phrase "approximately the boiling point of HF at reaction pressure" is what would be construed to encompass operation generally within the foregoing limits.

One of the most unexpected and surprising facets of this invention is exemplified by the data illustrated in the graph of FIG. 4 showing the variation of selectivity to the fluorochloroalkane with fluoride ion concentration. Ethylene was chlorinated in liquid HF but contained concentrations of NaF varying from 0 to 5 M/l. The results plotted in FIG. 4 show that at both 10° C. and 75° C. the amount of chlorofluorinated product reaches a maximum at about 1 M./l. and falls off with further increases in NaF concentration. There seems to be no obvious explanation for this unusual salt effect. A possible cause for the drop in selectivity at higher NaF concentration is the possible formation of compounds such as $NaF \cdot (HF)_x$, wherein $x$ is a positive integer of unknown value, in which the fluoride is not available to react. Complex fluoride, it is believed, is not effective in promoting the reaction, except perhaps that the complex may form a reservoir of fluoride ion upon dissociation as uncomplex fluoride ion is depleted.

The data in FIG. 4 were obtained under generally the same conditions as previously described, with varying salt concentrations.

Additional data, not reported in FIG. 4, verify the continuing decrease in selectivity with increase in fluoride ion concentration up to 10 M./l.

Depending upon operating temperature, the unexpected advantages accruing from the addition of fluoride ion begin at fluoride ion concentrations of the order of about 0.1 M./l. At fluoride ion concentrations in the range of generally about 4 M./l. the selectivity has decreased to approximately equal that at 0 added fluoride concentration. This suggests operation at concentrations of the order of about 0.1 M./l. to the general range of about 4 M./l. The upper limit of advantageous fluoride ion concentration, however, is not clearly defined and depends upon operating temperature and pressure. Consequently, it is contemplated that the phrase "generally about 4 moles per liter" encompass and refer to the concentration of fluoride ion at which selectivity becomes significantly lower than comparable selectivity at 0 added fluoride ion concentration.

As previously indicated, sodium and potassium fluorides are the preferred ionic fluoride compounds useful in this invention; however, a variety of other fluoride salts have yielded comparable results. No significant difference was noted between additions of sodium or potassium fluoride and additions of lithium fluoride, aluminum chloride, etc.

The foregoing data were obtained using ethylene as the olefin. These data illustrate the temperature, pressure, and salt effects and data presented are exemplary of many synthetic runs not reported. Similar increase in selectivity and yield is accomplished using higher molecular weight olefins as well. Selectivity to the chlorofluorinated product is greater, in fact, with increasing $RCl^+$ stability, as shown in Table I.

TABLE I

Chlorofluorination of olefins

| Compound: | Percent chlorofluorination |
|---|---|
| Ethylene | 55 |
| Propene | 60 |
| 1-butene | 68 |
| Cis-2-butene | 73 |
| Trans-2-butene | 78 |
| Isobutylene | 2 |

The results of Table I are best interpreted when the synthesis equation is expanded to include an ion pair as a first intermediate, as follows:

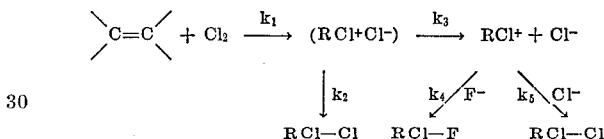

As $RCl^+$ becomes more stable the ratio $k_3/k_2$ increases and despite the fact that $k_5$ is much larger than $k_4$, the overwhelming concentration advantage of $F^-$ will favor the formation of $RCl-F$. Note that the $Cl^-$ concentration never increases due to the very low solubility of HCl in HF.

The apparent anomoly of isobutylene can be explained if one considers the stability of the chloro-t-butyl cation. This stability could diminish the driving force to the fluoride $[k_4(F^-)]$ while other reactions become more favorable. Thus the chloro-t-butyl cation can eliminate a proton to give a vinyl or allyl chloride. Chlorofluorination of these compounds could then yield the observed trihaloproducts.

During the course of these experiments it was discovered that when the reaction was carried out in the normal manner using isobutylene, β-methyl styrene and butadiene, a polymeric material containing fluorine and chlorine was formed. This polymer has not been characterized and the mechanism for its formation is not understood; however, the polymer will form a useful protective film by being heated and extruded or by solvent casting. Other conjugated dienes and easily polymerizable olefins may be regarded as fully equivalent in this reaction.

From the foregoing data and examples, it will be apparent that there are several advantages to the inventive process. First, the temperature-pressure relationship provides a means for signficantly increasing the selectivity to the desired fluorochloro substituted alkane even in the absence of added fluoride salt. Secondly, the addition of fluoride salt in the range of from 0.1 M./l. to generally about 4 moles per liter increases the specificity of the reaction to the desired fluorochloro product, independently of pressure and temperature. Thus, two independent but complimentary phenomena provide a method of quite unexpectedly increasing the selectivity of the process to the desired product.

Another important advantage of the present process is that it may, as indicated by simulated runs, be carried out continuously. This has not heretofore been possible and there was a considerable wastage of time, effort and materials. In the batch reaction possible in the prior art, it was necessary to discard large amounts of valuable chemicals at the end of each batch run and to replace these chemicals with fresh stock to begin each new run. As will be apparent from the foregoing, the present process may be conducted on a continuous basis. This is made possible by the evolution of HCl from the reaction mixture as chlorine is consumed. Fluoride ion is produced by the reaction of chloride ion with HF so that the fluoride ion concentration is not depleted. By continuously adding HF, chlorine, and the desired olefin, the reaction may be carried out continuously for an indefinite period of time.

Furthermore, by appropriate adjustment of the fluoride and/or other salt concentration in HF, a liquid phase of desired density may be formed. It is thereby possible to cause the resultant fluorochloro paraffin to float on top of the HF phase or to sink to the bottom of the HF phase, as desired. In either case, the product can be drained off from the bottom or skimmed off from the top permitting fully continuous operation using the improved process reactants and conditions of this invention.

Bearing in mind that the essential features of this invention are the carrying out of the reaction in the desired temperature range, at the desired pressure, utilizing HF as a reaction medium containing added fluoride ion and, as an auxiliary, the production of a fluoride containing polymer, it will be understood that many variations and modifications may be made from the precise operating and process conditions disclosed hereinbefore without departing from the spirit and scope of the invention as defined in the following claims.

We claim:
1. In a process for converting olefins to fluorochloro substituted hydrocarbons according to the reaction

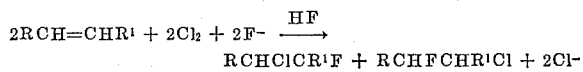

$$2RCH=CHR^1 + 2Cl_2 + 2F^- \xrightarrow{HF} RCHClCR^1F + RCHFCHR^1Cl + 2Cl^-$$

wherein R and $R^1$ are hydrogen, alkyl, aryl, or aralkyl, the improvement wherein the olefin is reacted with chlorine in the presence of a solution of HF and an alkali metal fluoride in a concentration within the range from about 0.1 to about 4 moles of alkali metal fluoride per liter of liquid HF under a pressure greater than 2 atmospheres.

2. The process of claim 1 wherein R and $R^1$ are hydrogen or lower alkyl.

3. The process of claim 1 wherein the reaction is carried out at approximately the boiling point of HF at reaction pressure.

4. The process of claim 3 wherein the reaction temperature is within about 7 degrees of the boiling point of HF solution at reaction pressure.

5. The process of claim 3 wherein R and $R^1$ are hydrogen or lower alkyl.

6. The process of claim 5 wherein the olefin is ethylene.

7. The process of claim 1 wherein the reaction pressure is from about 2 to 10 atmospheres, and the reaction temperature is within about 7 degrees of the boiling point of the HF reaction medium at reaction temperature and wherein the olefin contains from two to four carbon atoms.

8. The process of claim 1 wherein the olefin is ethylene.

9. In a process for converting an olefin corresponding to the formula $RCH=CHR^1$ wherein R and $R^1$ are independently hydrogen or lower alkyl to products comprising significant amounts of fluorochloro substituted saturated hydrocarbons, the improvement which consists of providing a reaction zone containing from about 0.1 to about 4 moles of alkali metal fluoride salt dissolved in liquid anhydrous HF under pressure greater than about 2 atmospheres and directing through such solution a mixture consisting of said olefin and chlorine in a mole ratio within the range from 20:1 to 1:20, and withdrawing from said solution the products comprising significant amounts of fluorochloro substituted saturated hydrocarbons.

10. The process of claim 9 wherein the pressure is between about 2 atmospheres and about 10 atmospheres.

11. The process of claim 1 wherein said olefin is selected from the group consisting of ethylene, propene, 1-butene, cis-2-butene, trans-2-butene, and isobutylene.

12. The process of claim 1 wherein R and $R^1$ each contain less than 6 carbon atoms.

13. The process of claim 1 wherein the reaction is carried out near the boiling point of the HF solution at reaction conditions.

References Cited

UNITED STATES PATENTS

| 2,554,857 | 5/1951 | Gochenour | 260—653.7 |
| 3,436,430 | 4/1969 | Hall | 260—653.4 |

FOREIGN PATENTS

| 580,140 | 8/1948 | Great Britain | 260—653.7 |

OTHER REFERENCES

Knvnyants e al.: Chem. Abstracts 65, 13498 g—13499a (1966).

Nieuwland et al.: The Chemistry of Acetylene, 95–106 (1945).

Hudlicky: Chemistry of Organic Fluorine Compounds, p. 91 (1962).

DANIEL D. HORWITZ, Primary Examiner

U.S. Cl. X.R.

260—651 F, 94.8, 94.3, 93.5